United States Patent
Altman et al.

(10) Patent No.: US 9,897,682 B2
(45) Date of Patent: Feb. 20, 2018

(54) MAGNETIC SYNCHRONIZATION FOR A POSITIONING SYSTEM

(71) Applicant: QUALCOMM Incorporated, San Diego, CA (US)

(72) Inventors: Nathan Altman, Raanana (IL); Noam Z. Kedem, Lachish (IL); Vadim Winebrand, Raanana (IL); Gal Rotem, Hod HaSharon (IL); Meir Agassy, Ramat Gan (IL); Arye Lerner, Kfar (IL)

(73) Assignee: QUALCOMM Incorporated, San Diego, CA (US)

( * ) Notice: Subject to any disclaimer, the term of this patent is extended or adjusted under 35 U.S.C. 154(b) by 585 days.

(21) Appl. No.: 14/229,778

(22) Filed: Mar. 28, 2014

(65) Prior Publication Data
US 2014/0293748 A1    Oct. 2, 2014

Related U.S. Application Data

(60) Provisional application No. 61/806,791, filed on Mar. 29, 2013.

(51) Int. Cl.
  G01S 3/808   (2006.01)
  G06F 3/043   (2006.01)
  G06F 3/0354  (2013.01)

(52) U.S. Cl.
  CPC ........ G01S 3/8083 (2013.01); G06F 3/03545 (2013.01); G06F 3/0433 (2013.01)

(58) Field of Classification Search
  CPC ... G01S 3/8083; G06F 3/03545; G06F 3/0433
  USPC ....................................................... 367/128
  See application file for complete search history.

(56) References Cited

U.S. PATENT DOCUMENTS

| | | | | |
|---|---|---|---|---|
| 5,308,936 A | * | 5/1994 | Biggs | G06F 3/043 178/18.04 |
| 7,336,262 B2 | | 2/2008 | Tsuji | |
| 7,852,318 B2 | | 12/2010 | Altman | |
| 8,604,365 B2 | | 12/2013 | Altman et al. | |
| 8,614,666 B2 | | 12/2013 | Whitman et al. | |
| 2008/0084789 A1 | * | 4/2008 | Altman | G06F 3/03545 367/127 |

(Continued)

FOREIGN PATENT DOCUMENTS

WO    WO-2005111653 A2    11/2005

OTHER PUBLICATIONS

International Search Report and Written Opinion—PCT/US2014/032284—ISA/EPO—Jul. 23, 2014.

*Primary Examiner* — James R Hulka
*Assistant Examiner* — John T Nolan
(74) *Attorney, Agent, or Firm* — Haynes and Boone, LLP

(57) ABSTRACT

A synchronization system for an acoustic signal-based positioning system is provided that generates a magnetic field as a synchronization signal. The magnetic synchronization signal is transmitted by a transmitter of the positioning system and received by the receiver of the positioning system. The receiver may include a magnetic synchronization signal receiver that may receive the magnetic synchronization signal on a same acoustic channel as an acoustic positioning signal. Moreover, the magnetic synchronization signal receiver may be a component already present in the receiver and capable of receiving a magnetic synchronization signal.

28 Claims, 7 Drawing Sheets

(56) References Cited

U.S. PATENT DOCUMENTS

2011/0015893 A1* 1/2011 Altman .................... G06F 1/12
702/150

* cited by examiner

MAGNETIC SYNCHRONIZATION FOR A POSITIONING SYSTEM

CROSS REFERENCE TO RELATED APPLICATIONS

Pursuant to 35 U.S.C. § 119(e), this application claims priority to the filing date of U.S. Provisional Patent Application No. 61/806,791, filed on Mar. 29, 2013, the disclosure of which is hereby incorporated by reference in its entirety.

TECHNICAL FIELD

Embodiments disclosed herein are generally directed to an acoustic signal-based positioning system using a magnetic synchronization signal.

BACKGROUND

Acoustic signal-based positioning systems may be used with mobile devices such as smartphones, tablets, and laptops. Moreover, acoustic signal-based positioning systems may be used with basically any computing device that has a screen. One example of an acoustic signal-based positioning system is a digital pen having an acoustic signal transmitter that is in communication with a receiver that is a computing device, wherein the digital pen is used to interact with the computing device. A conventional acoustic signal-based positioning system includes a transmitter that emits acoustic signals and a receiver which receives the emitted signals. The receiver measures the propagation time delay, referred to as Time of Arrival ("TOA"), of the received acoustic signal, and may multiply the TOA by the speed of sound, to determine a position of the transmitter. Using multiple receivers may allow triangulation and/or another form of multilateration, and provide for the determination of a position in two or even three dimensions.

Acoustic positioning systems that determine a position based on a time delay may also be synchronized or non-synchronized. Synchronized systems may use a synchronization signal that has a speed that is faster than the speed of sound and is transmitted to the receiver for synchronizing the clocks of the transmitter and receiver. Non-synchronized systems may use multiple receivers for receiving the emitted acoustical signal and calculating a Differential Time of Arrival ("DTOA") that is a time delay measured between the multiple receivers. Generally, synchronized systems may be less susceptible to errors and less affected by temperature, calibration errors, and/or time delay errors.

Accordingly, there is a need for an improved synchronization system for acoustic signal-based positioning systems that have low power requirements, do not require dedicated synchronization hardware and are easy to implement in a variety of electronic devices.

SUMMARY

Consistent with some embodiments, there is provided a positioning system. The system includes a transmitter including an acoustic signal transmitter configured to transmit a modulated acoustic signal and a magnetic synchronization signal transmitter configured to transmit a modulated magnetic synchronization signal. The system also includes a receiver including an acoustic signal receiver configured to receive the transmitted modulated acoustic signal and a magnetic synchronization signal receiver configured to receive the transmitted modulated magnetic synchronization signal. The system further includes a processing component configured to receive the modulated acoustic signal from the acoustic signal receiver and the modulated magnetic synchronization signal form the magnetic synchronization signal receiver on the same time domain, and using similar input circuits for acoustic and magnetic signals to determine a position of the transmitter based on the modulated synchronization signal and a determined time delay of the modulated acoustic signal.

Consistent with some embodiments, there is also provided a receiving device for an acoustic signal-based positioning system. The receiving device includes an acoustic signal receiver configured to receive a modulated acoustic signal and a magnetic synchronization signal receiver configured to receive a modulated magnetic synchronization signal. The receiving device also includes a processing component configured to receive the modulated acoustic signal from the acoustic signal receiver and the modulated magnetic synchronization signal from the magnetic synchronization signal receiver on a single path and using similar circuits for acoustic and magnetic signals to determine a position of an object emitting the modulated acoustic signal and the modulated magnetic synchronization signal based on the received modulated synchronization signal and a determined time delay of the received modulated acoustic signal.

Consistent with some embodiments there is also provided a method for determining a position of an object. The method includes steps of receiving at least one modulated ultrasonic waveform and a modulated magnetic synchronization signal emitted by the object, wherein receiving the at least one modulated ultrasonic waveform comprises receiving at least a first version of the at least one modulated ultrasonic waveform at a first acoustic sensor of the detector arrangement and a second version of the at least one modulated ultrasonic waveform at a second acoustic sensor of the detector arrangement, decoding the received versions of the modulated ultrasonic waveform and the received modulated magnetic synchronization signal, wherein the received versions of the modulated ultrasonic waveform and the received modulated magnetic synchronization signal are received by a processing unit on a same path, measuring a time delay between each of the decoded versions of the modulated ultrasonic waveform and the decoded modulated magnetic synchronization signal, converting the measured time delays to at least a first distance and a second distance, and determining the position of the object based on triangulating the first distance and the second distance. The method may also be embodied in computer-readable media.

Consistent with some embodiments, there is further provided a system for determining a position of an object. The system includes means for receiving at least one modulated ultrasonic waveform and a modulated magnetic synchronization signal emitted by the object, wherein the means for receiving the at least one modulated ultrasonic waveform is configured to receive at least a first version of the at least one modulated ultrasonic waveform at a first sensing means of the means for receiving and a second version of the at least one modulated ultrasonic waveform at a second sensing means of the means for receiving. The system also includes means for decoding the received versions of the modulated ultrasonic waveform and the received modulated magnetic synchronization signal, wherein the received versions of the modulated ultrasonic waveform and the received modulated magnetic synchronization signal are received by the means for decoding on a same path. The system also includes means for measuring a time delay between each of the decoded versions of the modulated ultrasonic waveform and the decoded modulated magnetic synchronization signal and means for converting the measured time delays to at least a first distance and a second distance. The system further includes means for determining the position of the object based on triangulating the first distance and the second distance.

Figure 1:
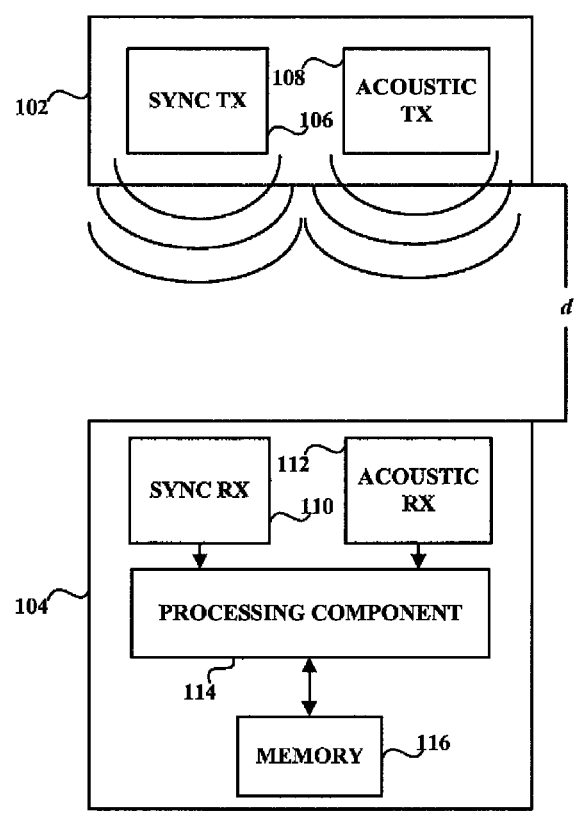
FIG. 1 is a diagram illustrating an acoustic positioning system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

FIG. 1 is a diagram illustrating an acoustic positioning system, consistent with some embodiments. As shown in FIG. 1, positioning system 100 includes a transmitting device 102 whose position is to be determined within an approximate range, e.g. within a defined area, and a receiving device 104 for picking up signals transmitted by transmitting device 102. In some embodiments, receiving device 104 may be stationary while the transmitting device 102 is moving. However, in other embodiments receiving device 104 may be moving while transmitting device 102 is stationary.

Transmitting device 102 may include a synchronization signal transmitter 106 and an acoustic signal transmitter 108. In some embodiments, acoustic signal transmitter 108 may transmit an ultrasonic signal. Moreover, the transmitted acoustic signal may be a modulated continuous signal, including a modulated continuous ultrasonic signal. For example, a signal range of the modulated continuous ultrasonic signal may vary between around 20 and 80 KHz and/or up to 200 KHz. In some embodiments, the modulated continuous ultrasonic signal comprises a modulated continuous wave ultrasonic signal having a carrier signal part and a baseband signal part that is modulated onto the carrier signal part.

Receiving device 104 includes a synchronization signal receiver 110 and an acoustic signal receiver 112. In some embodiments, acoustic signal receiver 112 may be one or more microphones. Receiving device 104 may also include a processing component 114 and a memory 116. In some embodiments, processing component 114 may be one or more processors, central processing units (CPUs), image signal processors (ISPs), micro-controllers, or digital signal processors (DSPs), graphics processing units (CPUs), and audio signal processors, which may include analog and/or digital audio signal processors. Memory 116 may include a system memory component, which may correspond to random access memory (RAM), an internal memory component, which may correspond to read only memory (ROM), and an external or static memory, which may correspond to optical, magnetic, or solid-state memories, for example. Memory 116 may correspond to a non-transitory machine-readable medium that includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which processing component 114 is capable of reading. Receiving unit 104 may be a stationary receiving unit. Receiving unit 104 may also be a computing device, such as a personal computer, a laptop computer, a mobile smartphone, or a tablet computer.

In some embodiments, acoustic receiver 112 may be capable of receiving acoustic signals emitted by acoustic signal transmitter 108. The received signals may be compared to an expected signal by processing component 114 according to instructions stored in memory 116 and an expected signal stored in memory 116 or generated by the processing unit 114, for example. In some embodiments, the expected signal may correspond to a replica of a pre-defined modulated continuous signal stored in memory 116, or a calculated modulated continuous wave signal, based on a template, model, and/or features stored in memory 116. In some embodiments, processing component 114 may compare received acoustic signals using carrier and baseband correlation. Comparing received acoustic signals with an expected acoustic signal is further discussed in U.S. Pat. No. 8,184,504, which is hereby incorporated by reference herein in its entirety.

In some embodiments, synchronization signal transmitter 106 may transmit a synchronization signal that may be detected by synchronization receiver 110 and used by processing component 114 to initiate a delay count for receiving the acoustic signal from acoustic signal transmitter 108, which may have a slower speed than the synchronization signal transmitted from synchronization signal transmitter 106. The delay count may then be used in determining a time delay of the received acoustic signal, wherein the time delay may be used along with a speed of propagation of the acoustic signal to determine a distance d between transmitting device 102 and receiving device 104. In some embodiments, the transmitted acoustic signal has a known speed, for example the speed of sound in air. In some embodiments, the synchronization signal may have a very small time delay with respect to the distance d between transmitting device 102 and receiving device 104. The received synchronization signal may also be used to synchronize clocks between transmitting device 102 and receiving device 104 to compensate for clock inaccuracy and/or drift. In some embodiments, a synchronization mechanism is included in receiving device 104, which may be stored, for example, in the memory 116 and executed by the processing component 114.

In some embodiments, processing component 114 may be capable of determining a position of transmitting device 102 with respect to receiving device 104 by measuring the time delay of the transmitted acoustic signals through a Line Of Sight (LOS). In some embodiments, a position of transmitting device 102 with respect to receiver device 104 may be determined based on cross-correlating the carrier signal and baseband signal from the received acoustic signal. In some embodiments, processing component 114 includes Fast Fourier Transform (FFT) capability and may be used to perform phase and amplitude analysis of the received acoustic signals. Moreover, processing component 114 may compare received acoustic signals with an expected signal that may be calibrated based on differences in phase, amplitude, and/or group delay.

Distance d between transmitting device 102 and receiving device 104 may be determined based on the time delay of the acoustic signal from transmitting device 102 to receiving device 104 on a LOS, e.g. the shortest distance between transmitting device 102 and receiving device 104. A position of transmitting device 102 may be determined based on a triangulation or another form of multilateration of the distances determined from receiving device 104. To determine a position in additional dimensions, additional receiving devices and/or additional acoustic signal receivers 112 may be used. In some embodiments, gain is processed using summing.

In some embodiments, synchronization signal receiver 110 and acoustic signal receiver 112 are stationary, spaced apart, and positioned at pre-defined locations with respect to receiving device 104. In some embodiments, receivers 110 and 112 may be positioned along an edge of a display unit associated with a processing device, which may correspond to any of a personal computer, a laptop computer, a tablet computer, a smartphone, a personal digital assistant, a wearable computing device, or other device. For computer pointing devices and/or for digital pen systems, a transmitting device may be embedded, attached or otherwise incorporated into a pointing device and/or pen while at least two receivers are positioned at defined stationary locations for receiving the transmitted signals in some embodiments. Based on the received signal, processing component 114 may calculate the time delay based on the carrier and baseband signal and may perform triangulation or other form of multilateration to determine the position of the transmitting device as a function of time.

In synchronized acoustic signal-based position systems, an infrared (IR) signal may be used for synchronization due to its low cost and low power requirements. IR may be a cost effective, low power synchronization method. However, it may be difficult to implement in the systems referred to above. For example, in a digital pen working on a screen of the handset or tablet, the handset or tablet may not include an IR receiver and it may be difficult to embed an IR receiver below the screen that has an acceptable signal sensitivity, for example such that the IR receiver is optically exposed to the exterior of the device. Even if an IR receiver is integrated within the system hardware, a dedicated hardware synchronization block may be required between the IR circuitry and audio processing circuitry of the device to maintain the required synchronization between the IR synchronization signal and the acoustic positioning signal.

Another synchronization signal that commonly may be used is a radio wave synchronization signal. However, using a radio wave as a synchronization signal may still require a dedicated hardware synchronization block between the radio wave circuitry and the audio processing circuitry to maintain the required synchronization, thus putting both circuits on the same time domain Moreover, generating and receiving a radio wave synchronization signal may use more power than generating and receiving an IR signal. Accordingly, there is a need for an improved synchronization system for acoustic signal-based positioning systems that have low power requirements, do not require dedicated synchronization hardware and are easy to implement in a variety of electronic devices. According to some embodiments, positioning system 100 may use a magnetic synchronization signal, with synchronization signal transmitter 106 being a magnetic synchronization signal transmitter 106 and synchronization signal receiver 106 being a magnetic synchronization signal receiver 106. Magnetic synchronization signal transmitter 106 may transmit a magnetic synchronization signal that is received by magnetic synchronization signal receiver 110 such that magnetic synchronization signal transmitter is magnetically coupled to magnetic synchronization signal receiver 110. In some embodiments, the magnetic synchronization signal may be modulated and may have a same modulation as an acoustic signal transmitted by acoustic signal transmitter 108. Examples and embodiments of transmitting device 102 including magnetic synchronization signal transmitter 106 and receiving device 104 including magnetic synchronization signal receiver 110 are provided in the following Figures and their associated description.

Figure 2:
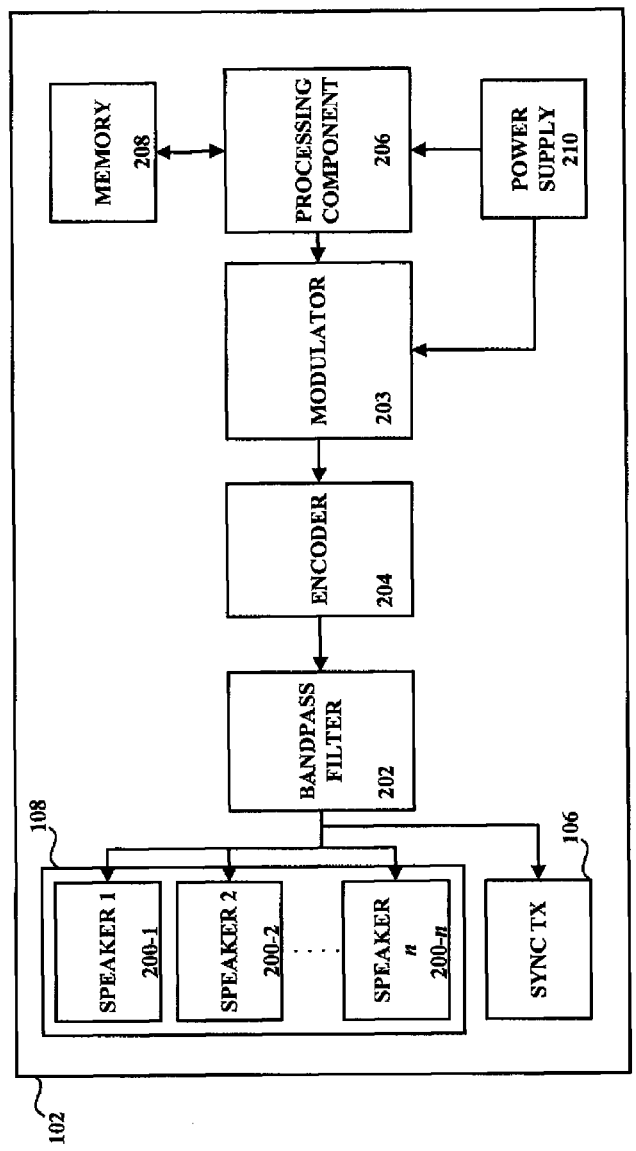
FIG. 2 is a diagram illustrating a transmitting device, consistent with some embodiments.

FIG. 2 is a diagram illustrating transmitting device 102, consistent with some embodiments. As shown in FIG. 2, acoustic signal transmitter 108 may include one or more speakers 200-1-200-$n$ (referred to collectively as speakers 200) capable of transmitting an acoustic signal. In some embodiments, speakers 200 may each be capable of transmitting a modulated continuous ultrasonic signal having a signal range of between around 20 and 80 KHz and/or up to 200 KHz. In some embodiments, the modulated continuous ultrasonic signal transmitted by speakers 200 may include a carrier signal part and a baseband signal part that is modulated onto the carrier signal part. Further, speakers 200 may be oriented at different locations on transmitting device 102, different angles, different orientations, and the like in order to transmit ultrasonic signals to receiving device 104 at different distances to permit triangulation of the ultrasonic signals for determining a position of transmitting device 102 with respect to receiving device 104. Further, speakers 200 may be located at different locations on transmitting device 102 to transmit ultrasonic signals for determining an attitude or angle of transmitting device 102 with respect to receiving device 104.

Magnetic synchronization signal transmitter 106 may be or include a coil or transformer coupled driven by a power source. In some embodiments, magnetic synchronization signal transmitter 106 may correspond to a coil or a transformer coupled to acoustic signal transmitter 108 for boosting the acoustic signal. The magnetic field or signal generated by magnetic synchronization signal transmitter 106 may establish a magnetic coupling with the detecting magnetic synchronization signal receiver 110. This generated field establishing the magnetic coupling acts as a magnetic synchronization signal between magnetic synchronization signal transmitter 106 and magnetic synchronization signal receiver 110. In some embodiments, the magnetic synchronization signal or field provides a timing retrieval accuracy of less than 30 ns. Magnetic synchronization signal transmitter 106 may also generate a spread spectrum magnetic synchronization signal by spreading the energy of the field across a frequency band to increase redundancy and robustness of the generated magnetic synchronization signal. In some embodiments, the larger the bandwidth of the spread, the more accurate of timing recovery achieved by the synchronization. In some embodiments, magnetic synchronization signal transmitter 106 may be coupled to a different power source than acoustic signal transmitter 108 and, thus, a separate electrical path or channel than acoustic signal transmitter 108.

Acoustic signal transmitter 108 and magnetic synchronization signal transmitter 106 may be coupled to bandpass filter 202, which may be capable of filtering a modulated signal generated by modulator 203 so that acoustic components of the modulated signal are sent to acoustic signal transmitter 108 and non-acoustic components of the signal are sent to magnetic synchronization signal transmitter 106. In some embodiments, modulator 203 may be a delta-sigma modulator capable of modulating a carrier signal part onto a baseband signal part. Bandpass filter 202 may be capable of filtering the sigma-delta out of band components from the modulated signals produced by modulator 203 to reduce current consumption. Moreover, both the baseband signal part and the carrier signal part may be modulated for enhanced timing accuracy and decreased interference. In some embodiments, both the magnetic synchronization signal and the acoustic signal may be modulated by modulator 203. In some embodiments, the magnetic synchronization signal and the acoustic signal may be modulated in at least one of amplitude, frequency, and phase by modulator 203. In some embodiments, the magnetic synchronization signal and acoustic signal may be modulated at a modulation period that is sufficiently large to allow determining a timing within the modulation period.

Consistent with some embodiments, transmitting device 102 may include an encoder 204 that may be capable of encoding additional data or information onto the generated magnetic synchronization signal and the generated acoustic signals. The additional data may include status indicators related to transmission device 102 or other information regarding parameters related to transmission device 102. For example, modulation for positioning may be encoded onto the generated magnetic synchronization signal and generated acoustic signals. Moreover, additional data specific to transmission device 102 may be encoded onto the generated signals by encoder 204, with such data including a power or battery status of transmitting device, whether switches have been pressed, and the like.

Modulator 203 may be coupled to a processing component 206, which is further coupled to a memory component 208 and a power supply 210. Processing component 206 may be one or more processors, micro-controllers, graphics processing units (GPUs) or digital signal processors (DSPs), capable of executing instructions stored in memory component 208 for controlling and operating transmitting device 102, including controlling modulator 203 and generating signals for modulation by modulator 203 and transmission by acoustic signal transmitter 108 and magnetic synchronization signal transmitter 106. Processing component 206 may further include or be coupled to a clock signal generator capable of generating clock signals for transmitting device 102. Memory component 208 may correspond to a random access memory (RAM), an internal memory component, a read-only memory (ROM), an EEPROM, or an external or static optical, magnetic, or solid-state memory, and may include instructions for execution by processing component 206, firmware, and the like.

Power supply 210 may be a direct current power supply, an alternating current power supply, and may also include a battery. Consistent with some embodiments, if acoustic signal transmitter 108 has a large capacitive component, power supply 210 may be capable of driving magnetic synchronization signal transmitter 106 to have a matching inductance. In some embodiments, the inductance value may be fixed by magnetic synchronization signal transmitter 106. Using a matching inductive driver may cause a center frequency of the modulation to also be the center frequency of the resonator formed from the inductive driver and acoustic signal transmitter 108 thereby improving the efficiency and effectiveness of acoustic signal transmitter 108.

In some embodiments, transmitting device 102 may be a positioning device capable of moving with respect to receiving device 104. For example, transmitting device 102 may be a stylus or a digital pen wherein the acoustic and synchronization signals transmitted by transmitting device 102 may be used to determine a position or location of transmitting device 102. Transmitting device 102 may further have one or more switches and a tip for writing on a surface and/or interacting with a touch screen device. The determined position or location of transmitting device 102 may be further used to determine writing or commands performed by transmitting device 102. Moreover, data regarding the switches on device and a pressure on a tip may be included as additional information in the synchronization signal. Further, transmitting device 102 may be a mobile device, such as a smart phone, tablet computer, personal digital assistant (PDA), or a wearable mobile device, such as a head-mounted display (HMD) or smart watch.

Transmitting device 102 may include more or less components than shown in FIG. 2 according to some embodiments. Moreover, components shown in FIG. 2 may be coupled to a bus (not shown), instead of being directly coupled to one or more other components. Furthermore, components shown in FIG. 2 may be shown as being part of a unitary system, but may also be part of a system where the components are separate but coupled and in communication. In general, the components shown in FIG. 2 are shown as examples of components in a transmitting device 102 capable of performing embodiments disclosed herein. However, a transmitting device 102 may have more or fewer components and still be capable of performing some embodiments disclosed herein.

Figure 3:
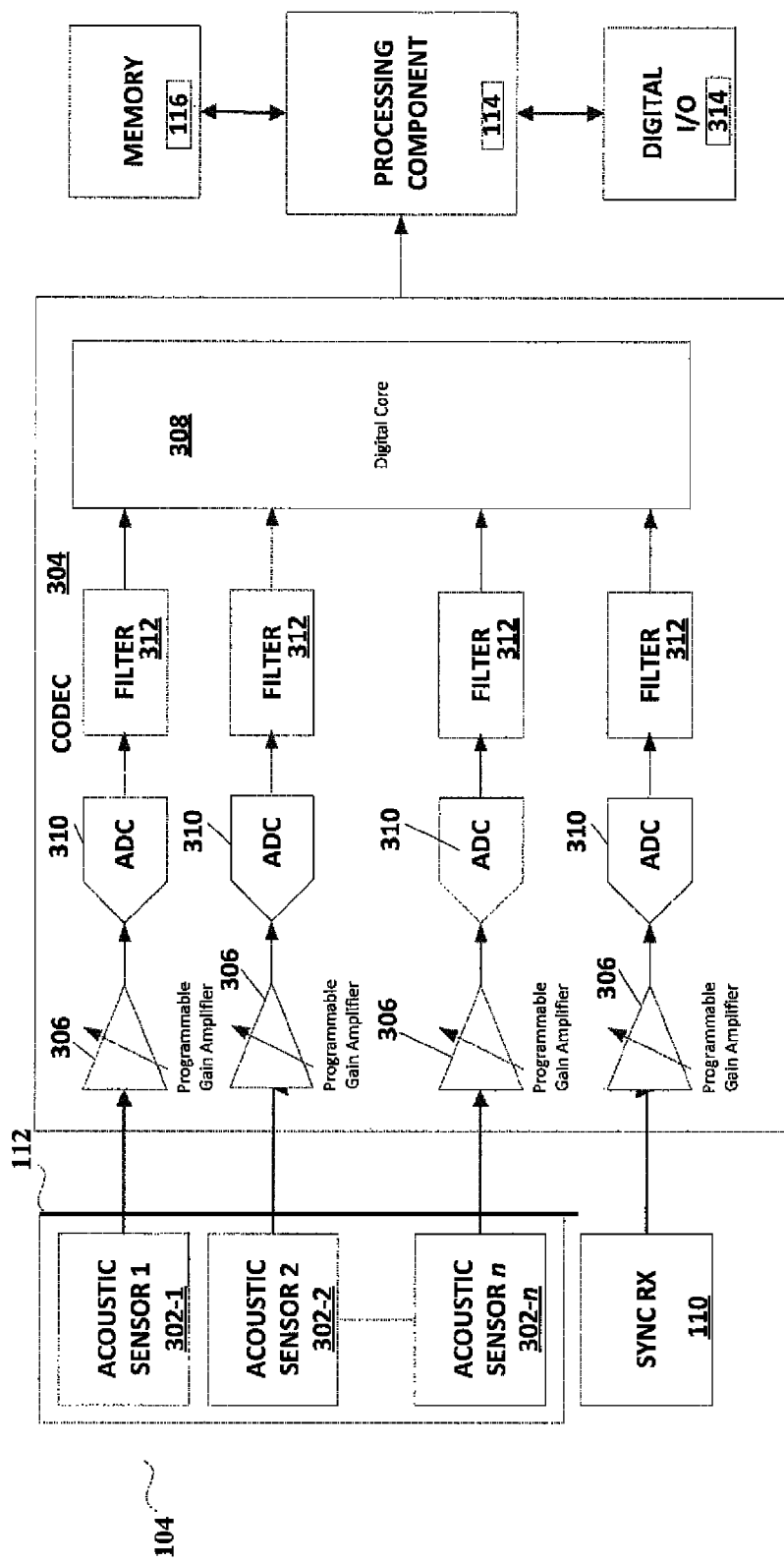
FIG. 3 is a diagram illustrating a receiving device, consistent with some embodiments.

FIG. 3 is a diagram illustrating receiving device 104, consistent with some embodiments. As shown in FIG. 3, acoustic signal receiver 112 may include acoustic sensors 302-1-302-n (referred to collectively as acoustic sensors 302). In some embodiments, acoustic sensors 302 may be microphones capable of detecting ultrasonic signals and, in further embodiments, may be microelectromechanical systems (MEMS) microphones. Acoustic signal receiver 112 may include as many acoustic sensors 302 as is required for positioning requirements, but may typically include a single acoustic sensor 302 for determining a position of transmitting device 102 in one-dimension, two acoustic sensors 302 for determining a position of transmitting device 102 in two dimensions, and three acoustic sensors 302 for determining a position of transmitting device 102 in three dimensions.

FIG. 3 illustrates a circuit with similar inputs. In that case, received acoustic and magnetic signals can be interchanged without having adverse impact on system performance. The same timing domain is used for a circuit for sampling microphone outputs, such as audio codecs, as is used for magnetic inputs. Audio codecs have usually a programmable gain amplifier followed by A/D converter. The samples from the A/D converter are streamed to an audio processor. In some embodiments, the acoustic signal and the magnetic signal are sampled simultaneously, in the same time domain of the audio codec. Sampling the magnetic signal in the same time domain in a synchronized manner to the audio sensors provides that the precise timing between magnetic and acoustic signal is kept. Sampling the magnetic (or RF) signal in the RE-front IC will not allow the level of synchronization as sampling both signals in the same time domain as in the audio codec. For instance, the RF circuit may have a timing offset and acoustic samples will have some time shift due to different time of jump-starting the RF circuit and the audio circuit. This is what the "same time domain" means.

As shown in FIG. 3, magnetic synchronization signal receiver 110 may be coupled to a similar input as acoustic signal receiver 112 such that acoustic signals received by acoustic sensors 302-1 through 302-n and a magnetic synchronization signal received by magnetic synchronization receiver 110 are provided for processing on the same timing domain. Consistent with some embodiments, the magnetic synchronization signal may be a modulated magnetic synchronization signal produced by magnetic synchronization signal transmitter 106, and magnetic synchronization receiver 110 includes a coil or similar feature for detecting the modulated magnetic synchronization signal and establishing a magnetic coupling. Although only one magnetic synchronization receiver 110 is shown in FIG. 3, additional synchronization receivers for receiving additional magnetic synchronization signals or other synchronization signals may be included in some embodiments.

The acoustic signal and magnetic synchronization signal may be provided to a coder-decoder (CODEC) 304. In some embodiments, CODEC 304 may act as a co-processor to processing component 114. CODEC 304 may include pre-amplifiers 306, digitizers 310, and filters 312. In some embodiments, CODEC 304 may have more or fewer components, modules, circuits, and the like than what is shown in FIG. 3, for example a decoder may be included. Pre-amplifiers 306 may amplify the received acoustic signals and magnetic synchronization signals. Decoders 308 may then decode information encoded into the acoustic signals and magnetic synchronization signal by encoder 204. The decoded acoustic signals and magnetic synchronization signals may then be digitized by digitizers 310. In some embodiments, digitizers 310 may be an analog-to-digital converters (ADC) capable of digitizing the received signals for output to processing component 114. CODEC 304 may also include a filters 312 that may include one or more filtering components. Usually the filter removes out of band components in order to avoid aliasing during decimation. The one or more filtering components may be capable of dynamically filtering out imperfections or anomalies in the received acoustic signals and the received magnetic synchronization signal, such as magnetic spikes or spurs. Moreover, if the magnetic synchronization signal is modulated with a large enough bandwidth, filter 312 may improve the quality of the received magnetic synchronization signal while not adversely impacting the timing of the synchronization signal. In some embodiments, filters 312 may be decimation filters. Moreover, filters 312 may be located outside of CODEC 304 such that in some embodiments, received acoustic signals and magnetic synchronization signals are filtered in parallel with the processing and conditioning performed by CODEC 304. As is further illustrated in FIG. 3, CODEC 304 may include a digital core 308 that receives signals from filters 312 and provides them to processing component 114.

Processing component 114 may be coupled to CODEC 304 to receive the signals from CODEC 304. Memory component 116 and a digital input and output 314 are coupled to processing component 116. Memory component 116 may correspond to a random access memory (RAM), an internal memory component, a read-only memory (ROM), EEPROM, or an external or static optical, magnetic, or solid-state memory, and may include instructions for execution by processing component 114, firmware, and the like. Digital I/O 314 may include any component capable of receiving digital output from processing component 114 or providing digital input to processing component 114.

Processing component 114 may be one or more processors, micro-controllers, graphics processing units (GPUs) or digital signal processors (DSPs), capable of executing instructions stored in memory component 116 for controlling and operating receiving device 104. For example, processing component 114 may be capable of executing instructions stored in memory component 116 for measuring time delays between the received acoustic signals and the magnetic synchronization signal, determining a distance to transmitting device 102 based on the measured time delays, and determining a position of transmitting device 102 from one or more determined distances.

As another example, processing component 114 may be capable of executing instructions for increasing a signal-to-noise ratio of the received synchronization and acoustic signals, that may include signal summing algorithms, differential correlation summing algorithms, and linear fitting algorithms. Although not shown, receiving device 104 may include a phase-locked loop (PLL), a delay-locked loop (DLL), or a digital phase-locked loop (DPLL) for increasing a signal-to-noise ratio of the received synchronization and acoustic signals. In some embodiments, the delay or phase-locked loops may be circuits included in receiving device 104 while in other embodiments, the loops may be encoded as algorithms that are executed by processing component 114. In some embodiments, processing component 114 may be capable of searching for an optimal drift and delay given an error cost function. The signal-to-noise ratio may be increased, in some embodiments, by adding additional magnetic synchronization signal receivers 110 on receiving device 104 to improve the reception of the magnetic synchronization signal. Moreover, processing component 114 may determine a received signal strength indication (RSSI) by determining a signal level of the received magnetic synchronization signal to be used as a measure of distance between transmitting device 102 and receiving device 104.

In some embodiments, receiving device 104 may be a device capable of receiving signals transmitted by transmitting device 102 for the purposes of determining a position, location, attitude, orientation, or angle of transmitting device. For example, receiving device 104 may be a base station, a computing device such as a desktop or laptop computer, a smartphone or tablet device, or a wearable device such as a head-mounted display (HMD) or a smart watch. Further, receiving device 104 may be coupled to or integrated into a base station, computing device, smartphone, or tablet device.

Receiving device 104 may include more or less components than shown in FIG. 3 according to some embodiments. Moreover, components shown in FIG. 3 may be coupled to a bus (not shown), instead of being directly coupled to one or more other components. Furthermore, components shown in FIG. 3 may be shown as being part of a unitary system, but may also be part of a system where the components are separate but coupled and in communication. In general, the components shown in FIG. 3 are shown as examples of components in a receiving device 104 capable of performing embodiments disclosed herein. However, a receiving device 104 may have more or fewer components and still be capable of performing some embodiments disclosed herein.

Figure 4A:
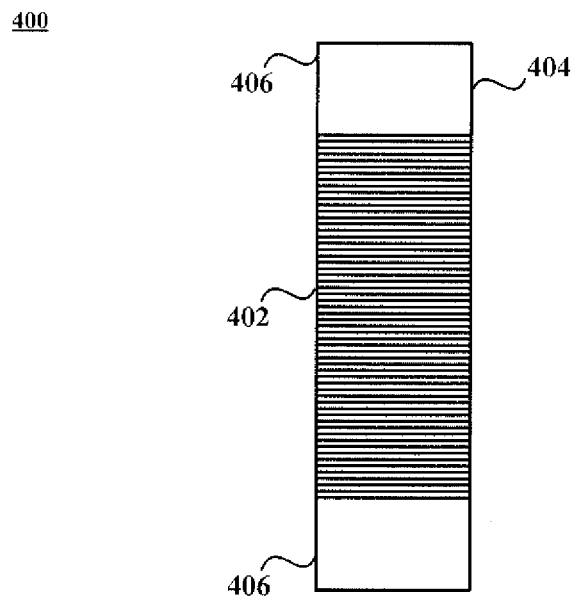
FIGS. 4A-4C are diagrams illustrating examples of a magnetic synchronization signal receiver or transmitter, consistent with some embodiments.
Figure 4B:
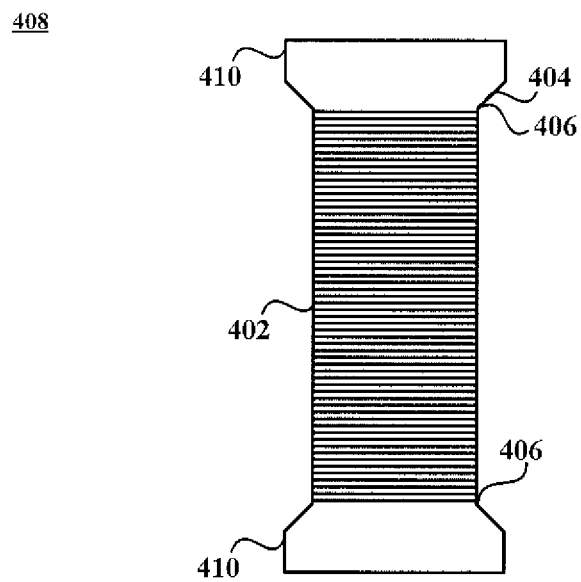
Figure 4C:
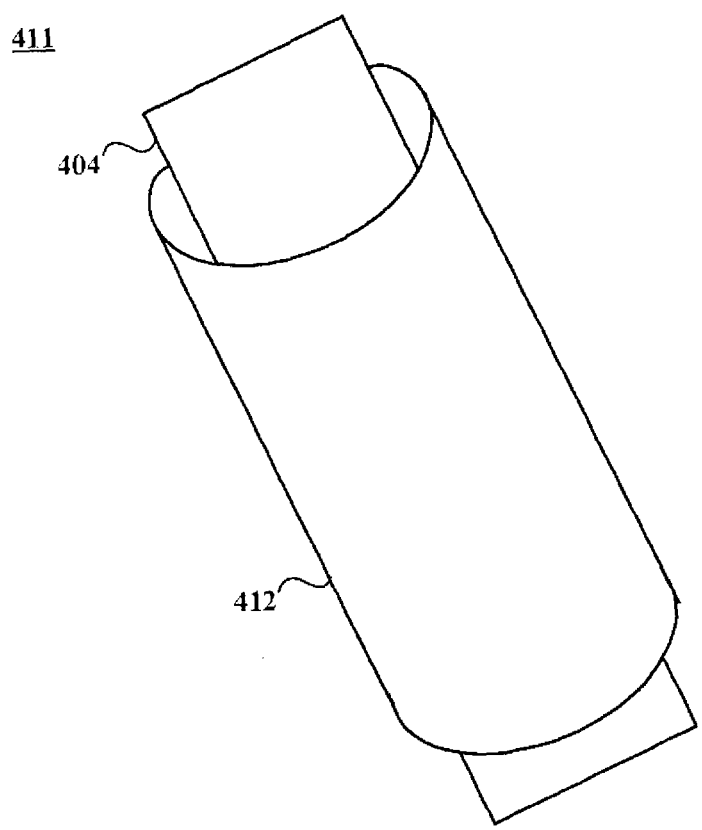

FIGS. 4A-4C are diagrams illustrating examples of magnetic synchronization signal receiver 110 or magnetic synchronization signal transmitter 106, consistent with some embodiments. As shown in FIG. 4A, a magnetic synchronization signal transmitter or receiver 400 may include a coil 402 wrapped around a core 404. When transmitter or receiver 400 receives a magnetic synchronization signal, an electric voltage may be generated in coil 402 which may correspond to the magnetic synchronization signal, and be transmitted for processing in receiving device 104. Similarly, when an electric signal is generated on coil 402, a magnetic signal may be generated and transmitted. Core 404 may be a ferrite core having an effective permeability that is equal to, or nearly equal to, an asymptote defined by the dimensions of core 404. In some embodiments, core 404 may have an apparent permeability µ that is a function of a ratio of the length of core to the diameter of core 404. Core 404 may also be a long and narrow core. In some embodiments, core 404 may be as long and as wide as permitted by transmitting device 102 or receiving device. Moreover, wiring 402 may cover as much of core 404 as possible. In some embodiments, ends 406 of core 404 may be coupled to pins, wiring, and the like, to transmit the received magnetic synchronization signal for processing or to receive generated electric signals for producing the magnetic synchronization signal.

When transmitter or receiver 400 is used in transmitting device 102, ends 406 of core 404 may be coupled to filter 202, modulator 204, or other components of transmitting device 102 for receiving an electric signal such as voltage to generate the magnetic synchronization signal. When transmitter or receiver 400 is used in receiving device 104, ends 406 of core 404 may be coupled to acoustic signal receiver 112 such that the received magnetic synchronization signal and the received acoustic signals are provided for processing on a same time domain however an inductance at the highest operating frequency of coil 402 may be limited by an input impedance of the acoustic channel. Consequently, a self-resonance of coil of wire may be chosen to be approximately 2 times higher than a frequency of the acoustic signals transmitted by transmitting device 102. Moreover, materials near coil 402, including core 404, may alter the transmitted or received magnetic synchronizations signal. In some embodiments, conductive or ferro-magnetic materials such as ferrite can be used for core 404 and may otherwise be positioned at or near coil 402 to influence the received or transmitted magnetic synchronization signal. For example, materials may be included that alter or change an angle, amplitude, phase or delay of the transmitted or received magnetic synchronization signal. In such examples, the processing component of receiving device 104 or transmitting device 102 may be calibrated to account for such alterations or changes.

As shown in FIG. 4B, transmitter or receiver 408 may be similar to transmitter or receiver 400, having a coil 402 wound around a core 404. However, transmitter or receiver 408 may have flanges 410 at the ends 406 of core 404 to increase an effective area of core 404 and, thus, the permeability µ of core 404 to also increase the strength of the magnetic field produced or received by transmitter or receiver 408.

In some embodiments, coil 402 may be a Telecoil that is available on hearing aids, assistive listening devices, and/or mobile devices for users that are hearing impaired, wherein receiving device 104 is integrated in or coupled to a hearing aid, assistive listening device, and/or mobile device. In such embodiments, coil 402 may detect an electromagnetic wave associated with sound, which generates an electrical signal that can be processed to produce the sound as well as a magnetic synchronization signal. In such embodiments, coil 402 may be more effective at detecting a magnetic synchronization signal when the sound being detected by coil 402 is modulated differently than the magnetic synchronization signal and the detected acoustic signal.

In some embodiments, transmitter or receiver 400 or 408 may also be used for near-field communications (NFC). For example, coil 402 may be a passive NFC coil while in other embodiments coil 402 may be a powered NFC coil. In some embodiments, coil 402 may work at 125 kHz, while in other embodiments coil 402 may work at 13.56 MHz. For devices that include an NFC component, such as an NFC-enabled smart phone, tablet, laptop, and the like, the NFC component may also be capable of being synchronization signal receiver 110 and receiving a magnetic synchronization signal generated by synchronization signal transmitter 106.

In some embodiments, transmitter or receiver 400 or 408 may also be used for wirelessly charging transmitting device, 102, receiving device 104 or another device in electrical communication with transmitting device 102 or receiving device 104. Alternatively, for devices that have wireless charging capabilities, the coil used for wireless charging of the device may be used as synchronization signal receiver 110.

FIG. 4C illustrates another example of synchronization signal transmitter or synchronization signal receiver 411, which may be a hollow cylinder 412 around core 404. In some embodiments, hollow cylinder 412 may be placed around acoustic signal transmitter 108 or acoustic signal receiver 112 such that the electrical signal used to produce an acoustic signal or the received acoustic signal induces a magnetic field from hollow cylinder 412. Although hollow cylinder 412 may be shorter in length than core 404, hollow cylinder 412 may have a larger cross-section which may compensate for the relatively short length.

As noted above, in some embodiments, transmitting device 102 may be in a pen device, such that magnetic synchronization signal transmitter or receiver 400, 408, and 412 may be a magnetic synchronization signal transmitter placed in the pen device. In such embodiments, core 404 may be placed within the pen device parallel to an ink cartridge. Moreover, if the pen device includes a metal body, a slit on the metal pen body can allow emission of the magnetic synchronization signal. Moreover, hollow cylinder 412 may be placed at a top of the pen to allow transmission of the magnetic synchronization signal that is unobstructed by a hand holding the pen device. In some embodiments, magnetic synchronization signal transmitter 106 may include two transmitters, such as core 404/wiring 402 assembly or hollow cylinder 412 oriented perpendicularly to each other. In such embodiments, a stronger synchronization signal may be received by magnetic synchronization signal receiver 110, particularly when the magnetic synchronization signal or field is orthogonal to an orientation of magnetic synchronization signal receiver 110. In some embodiments, additional coils may be placed on either or both of transmitting device 102 and receiving device 104 for detecting an orientation of the transmitting device 102 with respect to receiving device 104 or vice versa. In some embodiments, an "open" architecture transformer may be used in the device 102 instead of one of the acoustic transformers, so that the magnetic field will be closed outside a ferrite core used in the device 102.

Figure 5:
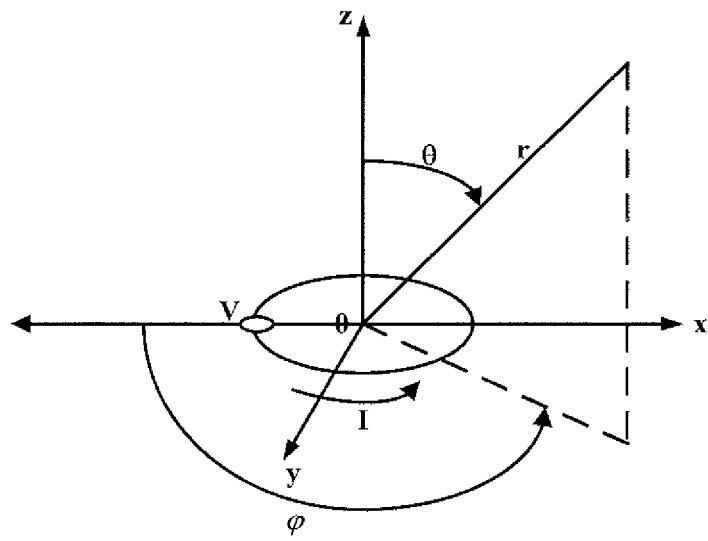
FIG. 5 is a diagram illustrating a magnetic field generated by a magnetic synchronization signal transmitter, consistent with some embodiments.

FIG. 5 is a diagram illustrating a generated magnetic field from magnetic synchronization signal transmitter 106, consistent with some embodiments. As shown in FIG. 5, when a voltage V is applied to a loop of coil 402, a current I may be generated in the loop coil 402 that produces a magnetic field $B_\theta$ in the direction of θ. As described in Smith, G. S., "Loop Antennas," from Volakis, J. L., *Antenna Engineering Handbook*, Fourth Edition, pp. 5-1-5-25, McGraw-Hill, 2007, magnetic field $B_\theta$ in the direction of θ may be determined by the following equation:

$$\text{for } \frac{1}{\beta} \ll r: |B_\theta| \cong \frac{\mu_0 \cdot m}{4 \cdot \pi \cdot r^3} \cdot \sin\varphi = \frac{\mu_0 \cdot \mu_R \cdot F_V \cdot I \cdot N \cdot A}{4 \cdot \pi \cdot r^3} \cdot \sin\varphi,$$

where β is a propagation constant in free space that may be equal to 2π/λ, φ is an angle of measurement, r is a distance from a loop of coil 402, $\mu_0$ is a permeability of free space, m is a magnetic moment, $\mu_r$ is a relative permeability, I is a current through a loop of coil 402, N is a number of turns of coil 402, A is an area of a loop of coil, and $F_v$ is an averaging factor.

Figure 6:
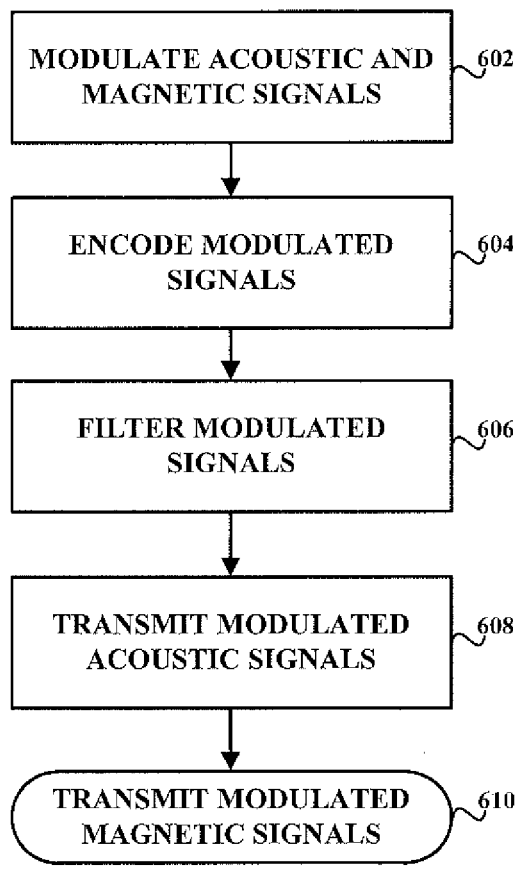
FIG. 6 is a flowchart illustrating a process for transmitting a positioning signal from an object that includes acoustic positioning signals and a magnetic synchronization signal, consistent with some embodiments.

FIG. 6 is a flowchart illustrating a process 600 for transmitting a positioning signal from an object that includes acoustic positioning signals and a magnetic synchronization signal, consistent with some embodiments. Process 600 may be performed by one or more components of transmitting device 102. In some embodiments, one or more steps of process 600 may be embodied in computer-readable media as instructions stored in memory component 208 for execution by processing component 206. In such embodiments, the instructions may be executed by processing component 206 to control process 600. As shown in FIG. 6, process 600 begins by modulating acoustic and magnetic signals (602). In some embodiments, processing component 206 may execute instructions for generating a signal to produce acoustic and magnetic signals for transmission. In some embodiments, power supply 210 may generate a voltage for producing acoustic and magnetic signals. Modulator 204 may then modulate the generated signals by modulating a carrier signal part onto a baseband signal part. In some embodiments, the modulation may be a delta-sigma modulation for encoding a generated analog signal into a digital signal. The modulated signals may then optionally be encoded by encoder 204 in step 604. In some embodiments, encoder 204 may encode additional data or information onto the generated magnetic synchronization signal and the generated acoustic signals. The additional data may include status indicators related to transmission device 102 or other information regarding parameters related to transmission device 102.

The modulated signals may then be filtered by bandpass filter 202 in step 606. In some embodiments, bandpass filter 202 may be capable of filtering the modulated signals into signals for generating an acoustic signal by acoustic signal transmitter 108 and signals for generating a magnetic synchronization signal by magnetic synchronization signal transmitter 106. Acoustic signal transmitter 108 may then transmit the modulated acoustic signals in step 608. In some embodiments, speakers 200 may receive the filtered modulated signals from bandpass filter 202 and generate a modulated acoustic signal that is transmitted from speakers 200. Further, the modulated acoustic signal that is transmitted from speakers 200 may be an ultrasonic signal and, in some embodiments, may be a continuous ultrasonic signal.

Magnetic synchronization signal transmitter 106 may then receive the filtered modulated signals from bandpass filter 202 and generate a modulated magnetic synchronization signal in step 610. In some embodiments, magnetic synchronization signal transmitter may include a coil 402 wrapped around a core 404, such as shown in FIGS. 4A and 4B, such that the filtered modulated signals have a voltage V that induces a current I in loops of coil 402 to produce a modulated magnetic synchronization signal B in a direction θ, such as shown in FIG. 5. In some embodiments, magnetic synchronization signal transmitter may include hollow cylinder 412 wrapped around a core 404, such as shown in FIG. 4C, such that the filtered modulated signals have a voltage V that, when applied to core 404, causes hollow cylinder 412 to produce a modulated magnetic synchronization signal.

Figure 7:
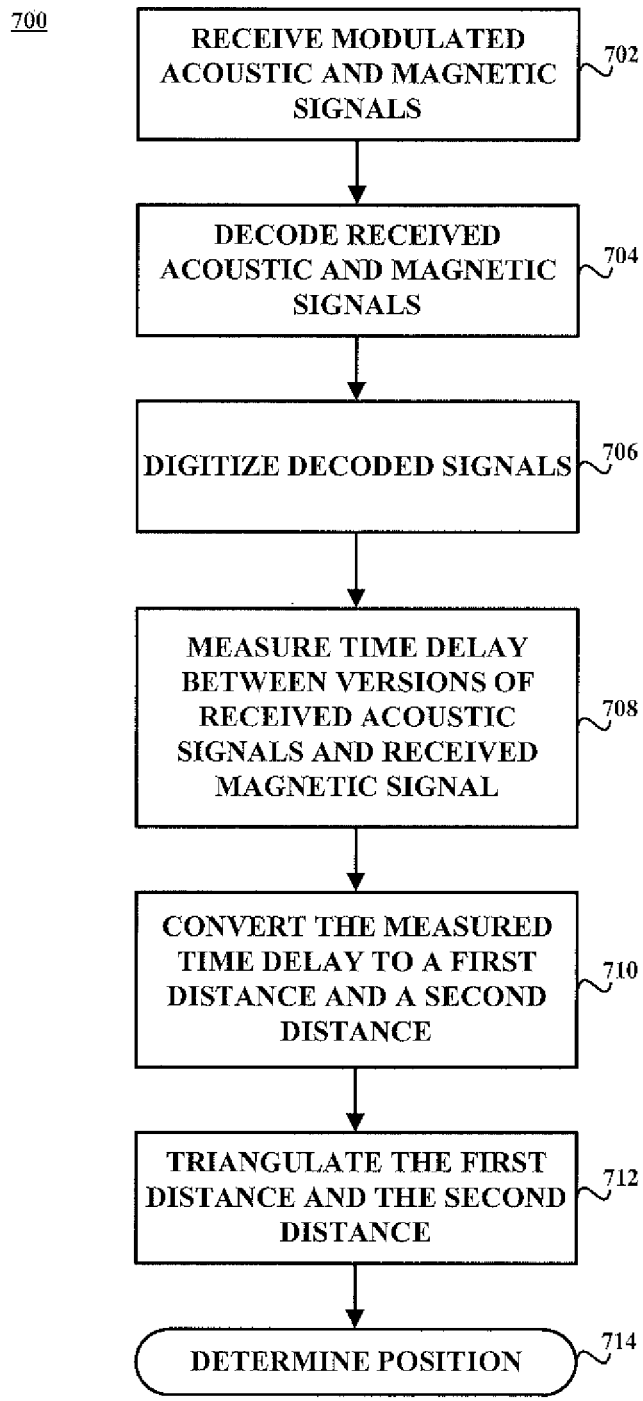
FIG. 7 is a flowchart illustrating a process for determining a position of an object emitting an acoustic positioning signal and a magnetic synchronization signal, consistent with some embodiments.

FIG. 7 is a flowchart illustrating a process 700 for determining a position of an object emitting an acoustic positioning signal and a magnetic synchronization signal, consistent with some embodiments. Process 700 may be performed by one or more components of receiving device 104. In some embodiments, one or more steps of process 700 may be embodied in computer-readable media as instructions stored in memory component 116 for execution by processing component 114. In such embodiments, the instructions may be executed by processing component 114 to control process 700. As shown in FIG. 7, process 700 begins when receiving device 104 receives the modulated acoustic and magnetic signals in step 702. In some embodiments, the received modulated acoustic and magnetic signals are receive from transmitting device 102. The received modulated acoustic signals may be received by acoustic sensors 302 which, in some embodiments, may cause an electric signal to be generated by the received modulated acoustic signals for processing. The received modulated magnetic synchronization signals may be received by magnetic synchronization signal receiver 110, which may include a coil 402 or hollow cylinder 412 wrapped around a core 404, such as shown in FIGS. 4A-4C, wherein the modulated magnetic synchronization signal may be received by core 404 and cause an electric signal to be generated in coil 402 or hollow cylinder 412 for processing. In some embodiments, the received modulated acoustic signals and the received modulated magnetic signals may be received and sent for processing on a same time domain such that the received modulated acoustic signals and the received modulated magnetic signals may be processed in the same domain.

The received modulated acoustic signals and the magnetic synchronization signals may be decoded by decoder 308 of CODEC 304 (704). In some embodiments, decoding may include extracting encoded information from the received acoustic and magnetic synchronization signals. The decoded signals may then be digitized by digitizer 310 in step 706. Processing component 114 may then receive the digitized signals and measure a times delay between versions of the received acoustic signals and the received magnetic synchronization signals (708). In some embodiments, each acoustic sensor 302 may receive a version of an acoustic signal transmitted by a speaker 200 of transmitting device 102. Moreover, each acoustic sensor 302 may receive versions of an acoustic signal transmitted by a different speaker 200 of transmitting device. Due to the speed of the acoustic signal, there is an associated time of flight associated with each received acoustic signal such that the acoustic signal may be received after a certain time delay from emission. Since the magnetic synchronization signal may be received by magnetic synchronization signal receiver 110 almost instantaneously, the received magnetic synchronization signal may be used to determine a time delay associated with the time of flight of each version of the received acoustic signal. Moreover, the magnetic synchronization signal may also be used by processing component 114 to synchronize a clock of receiving device 104 with a clock of transmitting device 102.

The measured time delay may then be converted to at least a first distance and a second distance (710). In some embodiments, each version of the received acoustic signal may be used by processing component 114 to determine a time delay, and each time delay may be used to determine a distance by knowing the speed of the acoustic signal and the time delay. Processing component 114 may then triangulate the first distance and the second distance (712) to determine a position (714) of transmitting device 102. The determined position may have a one-dimensional, two-dimensional, or three-dimensional position based on the number of speakers 200 in transmitting device 102 and the number of acoustic sensors 302 in receiving device 104. Moreover, in addition to a position, an attitude or angle of transmitting device 102 may be determined based on the position of speakers 200.

Consequently, embodiments as described herein may provide an acoustic signal-based positioning system that may be synchronized by establishing a magnetic coupling between a transmitter and the receiver. The magnetic coupling may be established by a magnetic synchronization signal generated by a synchronization signal generator that may be integrated with the transmitter device more easily than conventional synchronization systems. Moreover, the magnetic synchronization signal may be received by a synchronization signal receiver that may be integrated within the receiver and received on a same path as the acoustic signals removing the need for dedicated synchronization signal processing hardware. One skilled in the art may readily devise other systems consistent with the disclosed embodiments which are intended to be within the scope of this disclosure.

What is claimed is:
1. A positioning system, comprising:
a transmitter, the transmitter comprising:
an acoustic signal transmitter configured to transmit a modulated acoustic signal; and
a magnetic synchronization signal transmitter configured to transmit a modulated magnetic synchronization signal, wherein the modulated magnetic synchronization signal comprises a spread spectrum magnetic synchronization signal across a set frequency band for reception by a plurality of magnetic synchronization signal receivers;
an encoder configured to encode a battery status into one of the modulated acoustic signal or the modulated magnetic synchronization signal; and
a power source coupled to the magnetic synchronization signal transmitter and configured to use the magnetic synchronization signal transmitter to charge the power source based on the battery status and in response to transmitting the battery status using the encoder;
a receiver, the receiver comprising:
an acoustic signal receiver configured to receive the transmitted modulated acoustic signal;
a magnetic synchronization signal receiver configured to receive the transmitted modulated magnetic synchronization signal and wirelessly charge the power source through inductive charging using the magnetic synchronization signal transmitter;
a coder-decoder comprising at least a digitizer and configured to decode and digitize the battery status from the one of the modulated acoustic signal or the modulated magnetic synchronization signal; and
a processing component configured to receive the modulated acoustic signal from the acoustic signal receiver and the modulated magnetic synchronization signal from the magnetic synchronization signal receiver on a same time domain and using a single input circuit with a plurality of inputs for acoustic and magnetic signals, determine a received signal strength indication (RSSI) using the received modulated synchronization signal, determine a position of the transmitter based on the received modulated synchronization signal and a determined time delay of the received modulated acoustic signal determined using at least the RSSI, decode the one of the modulated acoustic signal or the modulated magnetic synchronization signal to determine the battery status, determine a power level of the transmitter using the battery status, and use inductive charging to charge the transmitter through activating the magnetic synchronization signal transmitter.

2. The positioning system of claim 1, wherein the transmitted modulated acoustic signal comprises a modulated continuous ultrasonic signal.

3. The positioning system of claim 1, wherein the magnetic synchronization signal transmitter comprises a wiring wrapped around a core.

4. The positioning system of claim 3, wherein the core comprises a ferrite core.

5. The positioning system of claim 4, wherein the ferrite core comprises flanges at either end of the ferrite core.

6. The positioning system of claim 1, wherein the magnetic synchronization signal transmitter comprises a hollow cylinder.

7. The positioning system of claim 1, wherein the magnetic synchronization signal receiver comprises a coil.

8. The positioning system of claim 7, wherein the magnetic synchronization signal receiver comprises a portion of an assistive listening device.

9. The positioning system of claim 7, wherein the coil is a near-field communications (NFC) coil.

10. The positioning system of claim 1, wherein the transmitter comprises a digital pen.

11. The positioning system of claim 1, wherein the processing component is configured to determine the time delay of the received modulated acoustic signal based on the received modulated magnetic synchronization signal.

12. The position system of claim 11, wherein the transmitter comprises a first clock and wherein the receiver comprises a second clock, wherein the processing component is configured to synchronize the second clock with the first clock based on the received modulated magnetic synchronization signal, and wherein the processing component is configured to determine the time delay of the received modulated acoustic signal based on the synchronized second clock.

13. The positioning system of claim 1, wherein the processing component is further configured to increase a signal-to-noise ratio of the received modulated synchronization signal and the received modulated acoustic signal during determining the position.

14. A receiving device for an acoustic signal-based positioning system, comprising:
an acoustic signal receiver configured to receive a modulated acoustic signal from a transmitter comprising a power source and a magnetic synchronization signal transmitter coupled to the power source;
a magnetic synchronization signal receiver configured to receive a modulated magnetic synchronization signal from the transmitter, wherein the modulated magnetic synchronization signal comprises a spread spectrum magnetic synchronization signal across a set frequency band for reception by the magnetic synchronization signal receiver, and wherein the magnetic synchronization signal receiver is configured to wirelessly charge the power source of the transmitter through inductive charging using the magnetic synchronization signal transmitter of the transmitter;
a coder-decoder comprising at least a digitizer and configured to decode and digitize a battery status encoded to one of the modulated acoustic signal or the modulated magnetic synchronization signal based on usage of the transmitter; and
a processing component configured to receive the modulated acoustic signal from the acoustic signal receiver and the modulated magnetic synchronization signal from the magnetic synchronization signal receiver on a single path and using a single input circuit with a plurality of inputs for acoustic and magnetic signals, determine a received signal strength indication (RSSI) using the received modulated magnetic synchronization signal, determine a position of an object emitting the modulated acoustic signal and the modulated magnetic synchronization signal based on the received modulated magnetic synchronization signal and a determined time delay of the received modulated acoustic signal determined using at least the RSSI, decode the one of the modulated acoustic signal or the modulated magnetic synchronization signal to determine the battery status, determine a power level of the transmitter using the battery status, and use inductive charging to charge the transmitter through activating the magnetic synchronization signal transmitter.

15. The receiving device of claim 14, wherein the modulated acoustic signal comprises a modulated continuous ultrasonic signal.

16. The receiving device of claim 14, wherein the magnetic synchronization signal receiver comprises a coil.

17. The receiving device of claim 16, wherein the magnetic synchronization signal receiver comprises a portion of an assistive listening device.

18. The receiving device of claim 16, wherein the coil is a near-field communications (NFC) coil.

19. The receiving device of claim 14, wherein the modulated acoustic signal and the modulated magnetic synchronization signal have a same modulation.

20. The receiving device of claim 14, wherein the processing component is configured to determine the time delay of the received modulated acoustic signal based on the received magnetic synchronization signal.

21. The receiving device of claim 20, wherein the receiver further comprises a clock, the processing component being further configured to synchronize the clock based on the received modulated magnetic synchronization signal, and wherein the processing component is further configured to determine the time delay of the received modulated acoustic signal based on the synchronized clock.

22. The receiving device of claim 14, wherein the processing component is further configured to increase a signal-to-noise ratio of the received modulated synchronization signal and the received modulated acoustic signal during determining the position.

23. A method for determining a position of an object, comprising:
receiving, by a detector arrangement, at least one modulated ultrasonic waveform and a modulated magnetic synchronization signal emitted by the object comprising a power source and a magnetic synchronization signal transmitter coupled to the power source, wherein receiving the at least one modulated ultrasonic waveform comprises receiving at least a first version of the at least one modulated ultrasonic waveform at a first acoustic sensor of the detector arrangement and a second version of the at least one modulated ultrasonic waveform at a second acoustic sensor of the detector arrangement, and wherein at least one of the at least one modulated ultrasonic waveform or the modulated magnetic synchronization signal comprises a battery status encoded to the at least one of the at least one modulated ultrasonic waveform or the modulated magnetic synchronization signal based on usage of the object, wherein the modulated magnetic synchronization signal comprises a spread spectrum magnetic synchronization signal across a set frequency band for reception by the detector arrangement, and wherein the detector arrangement is configured to wirelessly charge the power source of the object through inductive charging using the magnetic synchronization signal transmitter of the object;
decoding, by a coder-decoder, the at least one modulated ultrasonic waveform and the modulated magnetic synchronization signal, wherein the at least one modulated ultrasonic waveform and the modulated magnetic synchronization signal are received by the processing unit on a single path;
digitizing the battery status from the at least one of the at least one modulated ultrasonic waveform and the modulated magnetic synchronization signal based on usage of the transmitter;
determining a received signal strength indication (RSSI) using the modulated magnetic synchronization signal;
measuring, by the processing unit, a time delay between each of the decoded versions of the at least one modulated ultrasonic waveform and the decoded modulated magnetic synchronization signal;
converting, by the processing unit, the measured time delays to at least a first distance and a second distance using the RSSI;
determining, by the processing unit, the position of the object based on triangulating the first distance and the second distance;
processing the digitized battery status from the coder-decoder to determine the usage of the transmitter;
determining the battery status based on the decoding the at least one modulated ultrasonic waveform and the modulated magnetic synchronization signal;
determining a power level of the object using the battery status; and
using inductive charging to charge the object through activating the magnetic synchronization signal transmitter.

24. The method of claim 23, further comprising synchronizing a first clock associated with the object with a second clock associated with the processing unit using the received modulated magnetic synchronization signal.

25. The method of claim 24, wherein synchronizing comprises compensating for a clock drift of the second clock and the first clock.

26. A system for determining a position of an object, comprising:
  means for receiving at least one modulated ultrasonic waveform and a modulated magnetic synchronization signal emitted by the object comprising a power source and a magnetic synchronization signal transmitter coupled to the power source, wherein the means for receiving is configured to receive at least a first version of the at least one modulated ultrasonic waveform at a first sensing means of the means for receiving and a second version of the at least one modulated ultrasonic waveform at a second sensing means of the means for receiving, and wherein at least one of the at least one modulated ultrasonic waveform or the modulated magnetic synchronization signal comprises a battery status encoded to the at least one of the at least one modulated ultrasonic waveform or the modulated magnetic synchronization signal based on usage of the object, wherein the modulated magnetic synchronization signal comprises a spread spectrum magnetic synchronization signal across a set frequency band for reception by the magnetic synchronization signal receiver, and wherein the means for receiving is configured to wirelessly charge the power source of the object through inductive charging using the magnetic synchronization signal transmitter of the object;
  means for decoding the at least one modulated ultrasonic waveform and the received modulated magnetic synchronization signal, wherein the at least one modulated ultrasonic waveform and the received modulated magnetic synchronization signal are received by a processing unit on a single path;
  means for digitizing the battery status from the at least one of the at least one modulated ultrasonic waveform and the modulated magnetic synchronization signal based on usage of the transmitter;
  means for determining a received signal strength indication (RSSI) using the modulated magnetic synchronization signal;
  means for measuring a time delay between each of the decoded versions of the at least one modulated ultrasonic waveform and the decoded modulated magnetic synchronization signal;
  means for converting the measured time delays to at least a first distance and a second distance using the RSSI;
  means for determining the position of the object based on triangulating the first distance and the second distance;
  means for processing the digitized battery status to determine the usage of the transmitter;
  means for determining the battery status based on the decoding the at least one modulated ultrasonic waveform and the received modulated magnetic synchronization signal;
  means for determining a power level of the object using the battery status; and
  means for using inductive charging to charge the object through activating the magnetic synchronization signal transmitter.

27. The system of claim 26, further comprising means for synchronizing a first clock associated with the object with a second clock associated with the processing unit using the received modulated magnetic synchronization signal.

28. The system of claim 27, wherein the means for synchronizing is configured to compensate for a clock drift of the second clock and the first clock.

* * * * *